Feb. 10, 1970 V. S. GOLEMON 3,494,547

ZERO ENTRY MECHANISM

Filed Aug. 18, 1967 5 Sheets-Sheet 1

VALIA S. GOLEMON
INVENTOR.

BY Allan M. Shapiro

ATTORNEY

Feb. 10, 1970 V. S. GOLEMON 3,494,547

ZERO ENTRY MECHANISM

Filed Aug. 18, 1967 5 Sheets-Sheet 2

VALIA S. GOLEMON
INVENTOR.

BY Allan M. Shapiro

ATTORNEY

Feb. 10, 1970 V. S. GOLEMON 3,494,547

ZERO ENTRY MECHANISM

Filed Aug. 18, 1967 5 Sheets-Sheet 3

VALIA S. GOLEMON
INVENTOR.

BY Allan M. Shapiro

ATTORNEY

INVENTOR.
VALIA S. GOLEMON
BY Allan M. Shapiro
ATTORNEY

INVENTOR.
VALIA S. GOLEMON
BY Allan M. Shapiro
ATTORNEY

United States Patent Office 3,494,547
Patented Feb. 10, 1970

3,494,547
ZERO ENTRY MECHANISM

Valia S. Golemon, 2117 Screenland Drive,
Burbank, Calif. 91505

Filed Aug. 18, 1967, Ser. No. 661,591
Int. Cl. G06c 29/00
U.S. Cl. 235—60 13 Claims

ABSTRACT OF THE DISCLOSURE

A zero entry mechanism is disclosed herein having separate single and multiple zero amount keys operable via key members and a crossbar to set selected stop pins in a pin carriage which are operable in cooperation with an escapement means to control lateral movement of the pin carriage representative of decimal places. The escapement means is actuated by a universal bar responsive to depression of a selected zero amount key via the key members and the common crossbar. The escapement means includes a pivotal bellcrank having an extended bar adapted to be interposed between spaced teeth arranged in a row forming a rack carried by the pin carriage and a rectilinearly moving member attached to the bellcrank having a laterally pivoting stop projection adapted to be interposed in alignment with the setpins determined by amount-key depression so as to allow the pin carriage to move laterally for a selected distance representing one, two or three decimal-place locations.

BACKGROUND OF THE INVENTION

Field of the invention

This invention relates to calculating machines and, more particularly, to a novel zero entry mechanism for allowing a single zero or a multiple of zeros to be entered into the accumulator by depression of selected zero amount keys carried on the keyboard of the machine.

Description of the prior art

In calculating machines, it is the customary practice to employ an accumulator for storing a particular number value, sometimes of many digits, including successive zeros, which is initially entered therein by means of amount keys located on a keyboard that may be individually depressed by the operator's finger. The accumulator generally takes the form of a plurality of toothed gears which are engaged by associated toothed drive racks whereby the distance travelled by any one of the drive racks determines the degree of associated gear rotation. The distance travelled by each of the drive racks is determined by the setting of stop pins selected from a plurality carried in appropriate rows and columns on a pin carriage. The selected stop pins limit the movement of the aligned drive rack associated with each column of stop pins which both drives the accumulator to enter therein a value corresponding to the value of the depressed amount key and also sets the printing mechanism to print the said value.

Normally, the digit zero is treated the same as digits one to nine in that whenever a zero is introduced into the accumulator, the zero amount key is repeatedly depressed until the total number of zero values have been entered. For example, when it is desired to enter the value 10,000.00 into the accumulator, the "1" amount key is depressed followed by six successive and separate depressions of the single "0" amount key. Obviously, such a procedure of repeated zero amount key depressions is time consuming and awkward.

Recently, some attempts have been made to automatically cause a selected number of zero values to be entered into the accumulator whereby for the value 10,000.00 in the example above, three separate depressions are made on three individual zero amount keys corresponding to a single zero amount key, a double zero amount key, and a triple zero amount key. Therefore, the time required to enter the value 10,000.00 is reduced in half and the convenience to the machine operator is vastly improved. To provide a mechanism for automatically entering multiple zeros into the accumulator, a separate row of stop pins are usually carried on the pin carriage in addition to the stop pin rows normally carried thereon which are set by the selected zero entry amount key depressed so as to set one, two or three stop pins in the added zero stop pin row. An escapement is employed to hold the pin carriage in place while the stop pins are being set and effects the release thereof so that the pin carriage will laterally move the number of decimal places determined by the number of zero stop pins so set.

Although such a zero entry mechanism as just described provides the operator with a rapid and convenient machine for entering zeros into the accumulator, the inclusion of an additional row of stop pins on the pin carriage as well as complex escapement means complicates the overall machine mechanism and greatly crowds the parts and components of the machine. It is to be kept in mind that space within the machine housing is greatly restricted due to the many parts employed, a need for adequate room to accommodate movement of assemblies during machine cycling, and overall machine profile.

SUMMARY OF THE INVENTION

Accordingly, the problems and difficulties encountered with conventional calculating apparatus incorporating multiple zero entry keys are obviated by the present invention which provides a pin carriage having a normal arrangement of stop pins deployed in rows and columns operable to be set by depression of amount keys carried on the keyboard. Multiple zero amount keys are included which operate to set the stop pins in the row usually employed in conjunction with entering zeros into the accumulator so that one or more zero stop pins are set to permit the pin carriage to laterally move one or more decimal places when released. Escapement mechanism is provided including a first means for holding the carriage in fixed location between value entries by the amount keys as well as a second means for holding the carriage in fixed location during the value entry procedure. The first and second means are differentially actuated in common via a universal bar whenever an amount key is depressed and are arranged to operate differentially so that when the first means is in holding engagement with the carriage, the second means is not engaged therewith and vice versa. The universal bar is actuated by the crossbar which is moved every time a zero amount key is depressed via an associated key member. Key members of each zero amount key are preformed in configuration so as to be nested together in closely compacted, separate movable relationship.

Therefore, it is a primary object of the present invention to provide a novel zero entry mechanism for controlling lateral movement of a calculating machine pin carriage whereby the depression of a selected single or multiple zero amount key effects movement of the pin carriage for one or more than one decimal place location.

Another object of the present invention is to provide a novel zero entry mechanism for calculating machines which include differentially moving escapement means for restricting pin carriage movement when the machine is cycling and during zero entry into the machine accumulator.

Another object of the present invention is to provide a novel zero entry mechanism which employs a conventional pin carriage having stop pins conventionally arranged in rows and columns and including an escapement means for controlling lateral movement of the pin carriage which is relatively compact so as to occupy a minimum volume of space and which is operable upon the depression of the machine amount keys.

Yet another object of the present invention is to provide a novel zero entry mechanism whereby single zero, double zero or triple zero amount keys are employed for introducing one, two or three zeros into the accumulator of the machine so as to avoid repeated single entries of a zero in a number value having more than one consecutive zero.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURES 15*a* and 15*b* are views similar to the views shown in FIGURES 12 and 14, respectively, illustrating the position of the single zero key member and cross bar when the single zero amount key is depressed;

FIGURES 16*a* and 16*b* are views similar to the views of FIGURES 12 and 14, respectively, illustrating the key member and cross bar when the double zero amount key is depressed;

FIGURES 17*a* and 17*b* are views similar to the views of FIGURES 13 and 14, respectively, illustrating the position of the triple zero key member and cross bar when the triple zero amount key is depressed.

DESCRIPTION OF THE PREFERRED EMBODIMENT

Figure 1:
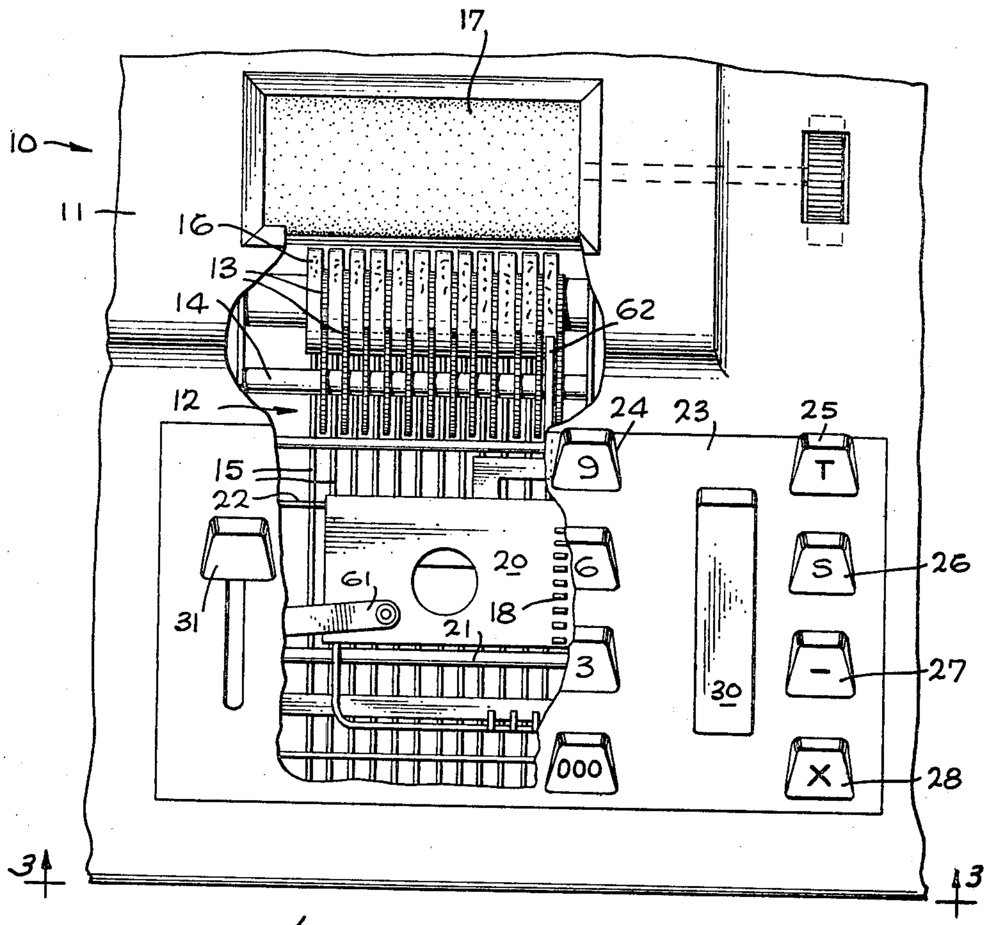
FIGURE 1 is a top plan view of a typical mechanical calculating machine suitable for incorporating the novel zero entry mechanism of the present invention and illustrating a portion of the housing cover broken away to show the general organization of machine parts and in particular, the pin carriage over which the inventive zero entry mechanism would be placed.

Referring now to FIGURE 1, a calculating machine is indicated in the general direction of arrow 10 which is similar to the machine more fully described in U.S. Letters Patent 3,313,480 and which includes a housing 11 partially broken away to expose intermediate printing dial gears 12, located over a mechanical accumulator of the two-directional subsequent transfer type, and having a plurality of toothed gears 13 for representing mechanically the entry or removal of the value of one digit to or from the accumulator. The toothed gears are mounted on a shaft 14 and each of similar toothed gears are rotated by means of engagement with teeth provided on an associated drive rack such as is indicated by numeral 15. The rotational position of each of the accumulator gears determines the position of a print wheel 16 via gears 13 so that the number carried in the accumulator may be printed on a paper record disposed between the print wheel 16 and a printing platen 17.

Each of the drive racks 15 are driven in a rectilinear direction for a predetermined distance depending upon the setting of selected stop pins indicated by numeral 18 carried on a pin carriage 20. The pin carriage 20 is movably mounted on a rod 21 and a support 22. The pin carriage and stop pins will be more fully described later with respect to FIGURE 5.

The stop pins 18 are arranged in rows representing digits 0–8, with the digit 9 stop being against the rack support bar, and in transverse columns representing decimal places and are selectively set by depression of amount keys carried on a keyboard 23. A typical amount key is indicated by numeral 24 which is identified as the digit "9" for entering that digital value into the accumulator. Also located on the keyboard are a variety of function keys such as a total key 25, a subtotal key 26, a subtract key 27, a repeat or multiplication key 28 and a motor bar 30 for initiating a machine operating cycle after the desired digits are entered into the accumulator. Also carried on the keyboard is a correct key 31 which is operable to manually move the pin carriage 20 to the right as indicated in the drawing to reset the stop pins 18 when it is desired by the operator to clear the pin carriage.

Figure 2:
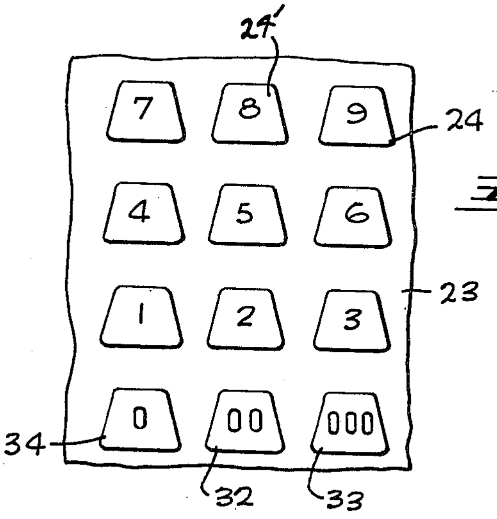
FIGURE 2 is a fragmentary plan view of the keyboard arrangement employed for actuating the zero entry mechanism incorporated into the machine of FIGURE 1.

Referring now to FIGURE 2, the operator controlled amount-key portion of the keyboard 23 for entering digital values into the machine is illustrated. The keyboard is of the 10-key type, and each amount key as indicated by numeral 24' representing the digital value "8" when depressed, sets a stop pin in the pin carriage which limits the movement of an aligned drive rack 15 which both drives the accumulator to enter therein a value corresponding to the value of the depressed key and also sets the printing mechanism to print the said value. However, it is to be noted that in addition to the ten amount keys corresponding to digits zero to nine, additional amount keys 32 and 33 are provided in alignment with a single zero amount key 34. Amount key 32 is employed for entering a double zero into the accumulator while amount key 33 is employed for entering a triple zero therein. In this manner, the machine operator may selectively enter a single zero by depressing amount key 34, a double zero by depressing amount key 32 or a triple zero by depressing amount key 33. Each of the zero amount keys provide indicia on the upper face thereof indicating the number of zeros to be placed in the accumulator upon depression thereof.

Figure 3:
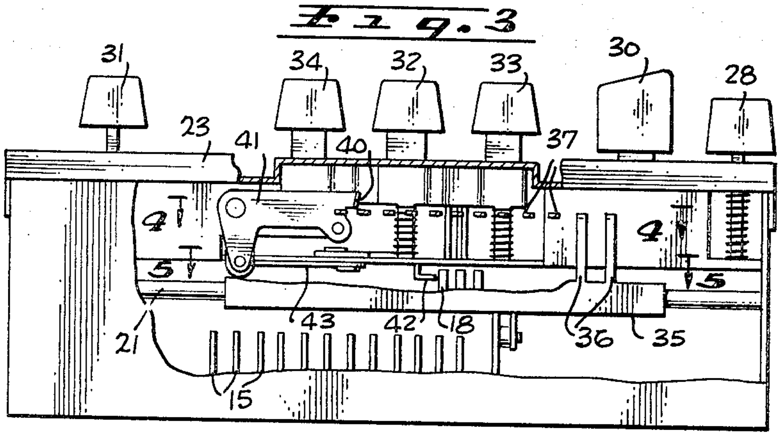
FIGURE 3 is a sectional view taken in the direction of arrows 3—3 of FIGURE 1 illustrating the zero entry mechanism disposed above the pin carriage.

Referring now in detail to FIGURE 3, it can be seen that the pin carriage 20 includes a carriage rack 35 which is mounted in common on the rod 21 and includes a plurality of upwardly projecting segments 36 which extend along the entire length of the rack 35. The uppermost end of each segment 36 terminates in an inwardly directed tooth indicated by the numeral 37. Each of the segments 36 are in alignment with the columns of stop pins carried on the carriage 20. The carriage rack 35 is partially broken away to expose the upper portion of stop pins 18 which are carried on the carriage 20.

Figure 5:
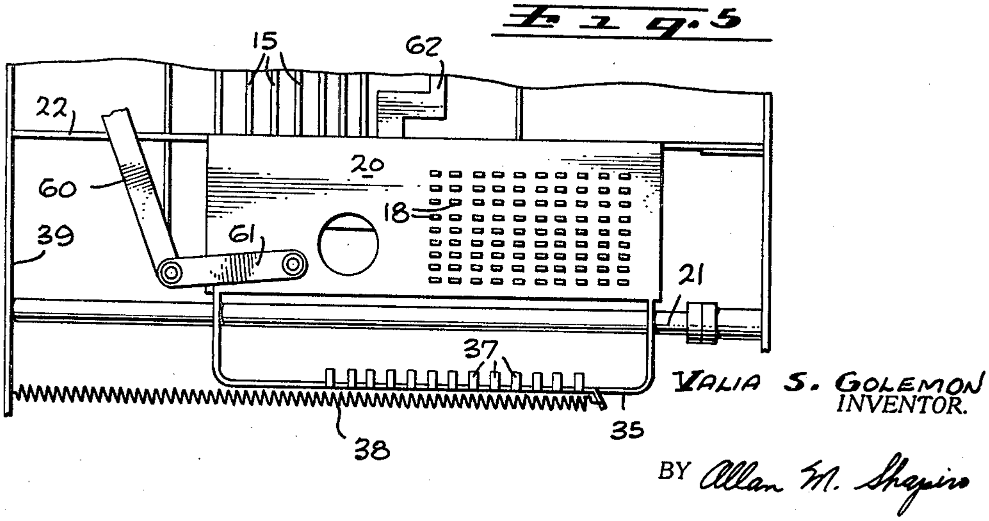
FIGURE 5 is a sectional view taken in the direction of arrows 5—5 of FIGURE 3 illustrating the pin carriage underlying the zero entry mechanism and the pin carriage rack upon which a portion of the escapement control mechanism operates.

The carriage 20 is in its normal position preparatory to the entry of the first digit of a number to be introduced into the machine accumulator which is the extreme right-hand side location of the machine. As the successive digits of a number are entered into the accumulator, the carriage will move laterally on the support 22 and rod 21 toward the left-hand side of the machine as shown in the drawing. The movement of the carriage 20 to the left-hand side is under the control of an expansion spring 38, as shown in FIGURE 5, which is connected at one end to the rack 35 and at its opposite end to a frame side 39. The resilient bias of the pin carriage to the left is restricted by an escapement means which ultimately and differentially position a projection 40 carried on the end of a bellcrank 41 into the space or gap between adjacent teeth 37 carried on the segments 36 of the carriage rack 35 and which laterally positions a stop member 42 carried on a member 43 between positions of blocking engagement with unset stop pins 18 from the zero row of stop pins and an unblocking position therefrom. When the machine is at rest, projection 40 is disengaged from the teeth of rack 35 while the stop member 42 is located in its blocking position to engage with the first unset stop pin 18. Thereby, the pin carriage 20 is prevented from moving laterally to the left because of the blocking engagement of the stop member 42 with the stop pin 18.

It is obvious that should a stop pin 18 be set by the depression of a zero amount key, the stop member 42 will permit the carriage to move thereunder until the stop member 42 engages with the next unset stop pin so that the pin carriage will move one increment, equivalent to a decimal place, to the left under the resilient bias of spring 38.

Figure 4:
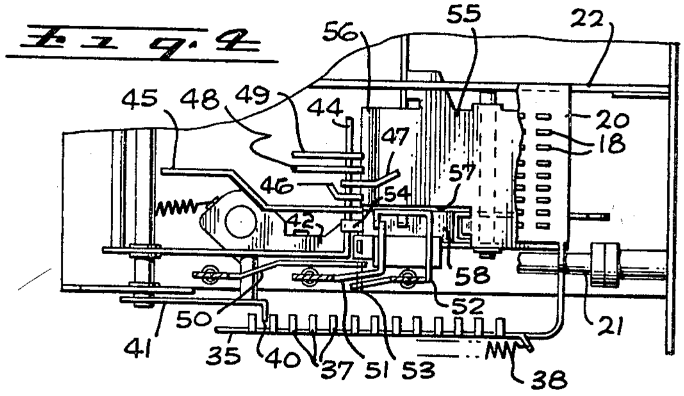
FIGURE 4 is a sectional view of the zero entry mechanism shown in FIGURE 3 as taken in the direction of arrows 4—4 thereof and illustrating the pin carriage control mechanism.

In FIGURE 4, it can be seen that the stop member 42 associated with the escapement means is in blocking interference with the stop pins arranged in the first row of stop pins settable by the zero amount keys 32–34, inclusive. Located immediately below each amount key, there is provided a key member which not only sets the selected stop pins on the pin carriage associated with the digit amount key depressed but pivots a universal bail or bar 44 to actuate the escapement means. The key members associated with digit amount keys "1–9" are indicated by numerals 45–49 inclusive. However, the key members associated with the single zero amount key 34 is indicated by numeral 50, the key member associated with the double zero amount key by numeral 51 and the key member associated with the triple zero amount key indicated by numeral 52. Key members 50, 51 and 52 are arranged to pass over and rest on a crossbar 53 having a tab 54 secured thereon so that the depression of any of the zero amount keys causes its associated key member to move the crossbar 53 downward and hence, to pivot the universal bar 44.

A stripper plate 55 is mounted immediately below the pin carriage 20 and includes a ramp surface 56 arranged to interfere with the bottom side of the set stop pins carried on the pin carriage 20. In this manner, at the conclusion of a machine cycling operation, when the pin carriage is being forcibly returned to the right-hand side of the machine, the stripper plate will engage with the bottom end of the stop pins and force the stop pins upward into their rest position on the pin carriage in readiness for another keyboard entry procedure. However, it will be noted that the stripper plate 55 includes an elongated notch 57 formed in the sides thereof immediately below the row of zero stop pins. Midway between the opposite ends of the stripper plate and at the end of the notch 57, there is provided a pivoted ramp 58 which engages with the stop pins 18 associated with the zero digit row so that the zero stop pins may be reset upon return of the pin carriage. Additional description with respect to this portion of the apparatus will be described later with respect to FIGURES 9–11.

Referring now to FIGURE 5, the pin carriage 20 is shown as being slidably mounted between support 22 and rod 21 wherein the bias of spring 38 urges the pin carriage to the left in the direction of frame side 39. Again, it can be seen that the inwardly projecting ends 37 of the segments 36 carried by the carriage rack 35 are substantially in alignment with the columns of stop pins which may be said to represent decimal place locations. The pin carriage may be manually moved against the bias of spring 38 by the correction key 31 via a pivoting linkage comprising links 60 and 61. The pin carriage includes a decimal place indicator 62 which is rigidly carried by the pin carriage so that it is substantially in alignment with the first column of stop pins 18 of the plurality. Therefore, as each digit is introduced into the accumulator by the depression of an amount key, the escapement means is actuated to release the pin carriage to move via spring 38 to the left for one decimal place and the indicator 62 visually indicates to the operator the decimal place represented by the last digit entered into the accumulator of the overall number being introduced. The extreme end of indicator 62 projects through the opening in the housing 11 adjacent the print wheels so that visual indication is made to the operator.

Figure 6:
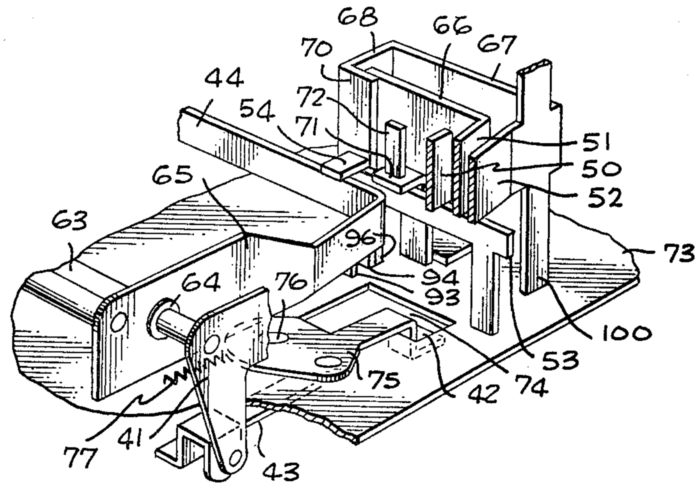
FIGURE 6 is a perspective view of the zero entry mechanism showing the key stems carried by the zero entry keys for engaging the pins carried on the pin carriage, the universal bar actuated by the zero entry key members and a portion of the pin carriage escapement control mechanism actuated by the universal bar.

With reference to FIGURE 6, it is to be noted that the universal bar is pivotally mounted on a rod 63 via connection 64 coupled to each leg 65 of the bar 44. The universal bar 44 is biased upwardly about its pivot connection 64 by means of a spring (not shown) so that the uppermost edge of the bar rests against the underside of tab 54. Although the key members associated with the amount keys for entering digits "1–9" operate to actuate the universal bar, these key members are not illustrated so that the key members 50, 51 and 52 associated with the zero entry mechanism will be more clearly shown.

The end of key member 50 associated with the single zero amount key terminates on the upper edge of crossbar 53 so that when the key member is depressed, the crossbar will be moved in a downward direction causing tab 54 to pivot the universal bar 44. Key members 51 and 52 extend over the crossbar 53 in a similar manner so that depression of the key members 51 and 52 will also cause downward movement of the crossbar 53. However, it is to be noted that key member 51 includes a transverse portion 66 which extends at a right angle to the major length of key member 51 that is located on the opposite side of the crossbar 53 from the side on which the universal bar 44 is located. Also, it is to be noted that key member 52 includes a transverse portion 67 which extends in parallel with respect to the transverse portion 66 and further includes an L-shaped flange 68 which terminates in an extension 70 that is disposed immediately adjacent to the end of transverse portion 66 between the portion 66 and the crossbar 53. Disposed between the major length of key member 51 and the extreme end of extension 70, there is provided a guide tab 71 having an aperture adapted to slidably receive an element 72 fixedly carried on the crossbar 53. Therefore, by this construction, the crossbar 53 is guided in its up and down movement by means of the element 72 within the aperture in the guide tab 71.

As will be more fully described later with respect to FIGURES 12–18, each of the key members includes stems which extend downwardly through apertures provided in a guide plate 73. The stems of the key members are employed to set the selected stop pins in the carriage 20. The guide plate 73 includes an opening 74 through which the stop member 42 projects under the guide plate while a body portion 75, which carries the stop member 42, is pivotally mounted on the upper surface of the guide plate 73 via pivot connection 76. The body portion 75 is resiliently biased by means of a spring 77 to normally locate the stop member 42 in blocking relationship with the row of zero pin stops.

Figure 7:
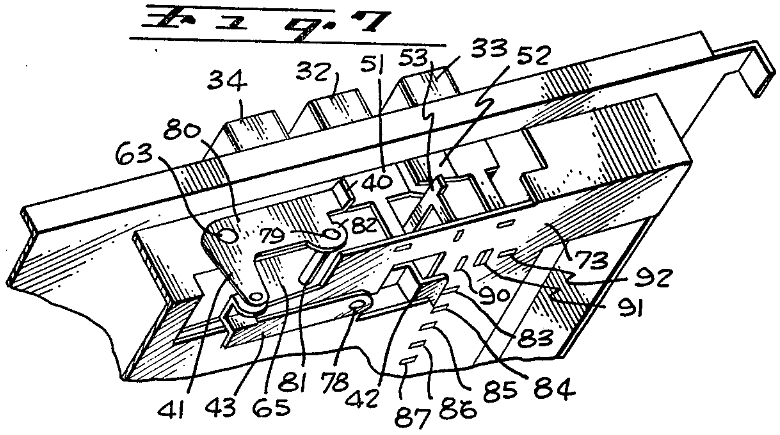
FIGURE 7 is a perspective view of the zero entry mechanism showing the underside of the pin carriage escapement control mechanism and the zero entry key stems terminating in slots provided in a guide plate.

Referring now to FIGURE 7, it can be seen that one end of the body portion 75 is pivotally attached to one end of member 43 by means of a pivot connection 78 so that as member 43 is moved in a rectilinear direction, the stop member 42 will be pivoted in a lateral direction against the bias of spring 77 via body pivotal connection 76. The opposite end of member 43 is pivotally attached to one end of bell crank 41 which is fixed to the rod 63 so as to rotate therewith in accordance with actuation of the universal bar 44. In order to stabilize a cantilevered arm 80 of the bellcrank 41 on which the projection 40 laterally extends, a connection bar 81 is provided which is secured on one end to the leg 65 of the universal bar and on its opposite end in a pivotal connection 79 to an extended portion 82.

Guide plate 73 is provided with a plurality of apertures as indicated by numerals 83–87 through which the stems carried by key members associated with amount keys "1–5" project upon the depression of the amount key. Plate 73 is also provided with apertures 90, 91 and 92 which are arranged in alignment perpendicular to the alignment of the apertures 83–87 inclusive and which represent apertures associated with the single zero amount key, double zero amount key and triple zero amount key, respectively. The apertures 90, 91 and 92 are so arranged on the guide plate 73 as to be in alignment immediately above the zero row of stop pins on the pin carriage.

Figure 8:
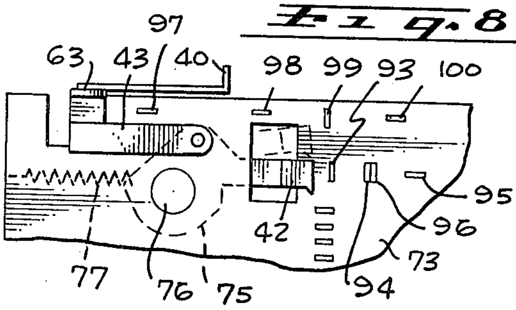
FIGURE 8 is a fragmentary bottom plan view of the pin carriage escapement control mechanism illustrated in solid lines in blocking alignment with the terminating ends of the zero entry key stems and in broken lines to show the unblocked position of the control mechanism.

With reference to FIGURE 8, the underside of the keyboard assembly is illustrated in which the terminating end of key member stems project through the apertures in the guide plate. A stem 93 fixed on one end of the crossbar 53 slidably moves through aperture 90, aperture 91 accommodates a key stem 94 while aperture 92 accommodates a key stem 95, both of which are downwardly depending from the key member 52 associated with the triple zero amount key. A key stem 96 is downwardly depending from the key member 51 associated with the double zero amount key and is arranged to slidably move through aperture 91 adjacent to the key stem 94. Other stems are adapted to slide through apertures in the guide plate such as is indicated by numerals 97–100 inclusive and these stems function as guides for various key members. However, stem 99 is carried on the opposite end of the crossbar 53 to its end carrying stem 93. These latter stems 97–100 inclusive are employed for stabilizing the moving key stems and crossbar and do not function in connection with the zero stop pins or the stop member 42.

When the escapement mechanism is operated by means of the universal bar 44, the projection 40 moves downwardly into a space between adjacent teeth 37 of the carriage rack 35 while the stop member 42 is pivoted laterally to its unblocking position as shown in broken lines. Therefore, it can be seen that during depression of an amount key, projection 40 will hold the carriage against lateral movement while stop member 42 is pivoted out of alignment with the row of zero stop pins. This condition exists momentarily during amount entry into the accumulator and as soon as the amount key is released, the universal bar 44 will pivot upwardly and projection 40 will disengage with the carriage rack 35 and the carriage will move under the biasing of spring 38 during which time the stop member 42 will pivot into blocking position to engage the first zero stop pin which has not been set.

Figures 9, 10, 11:
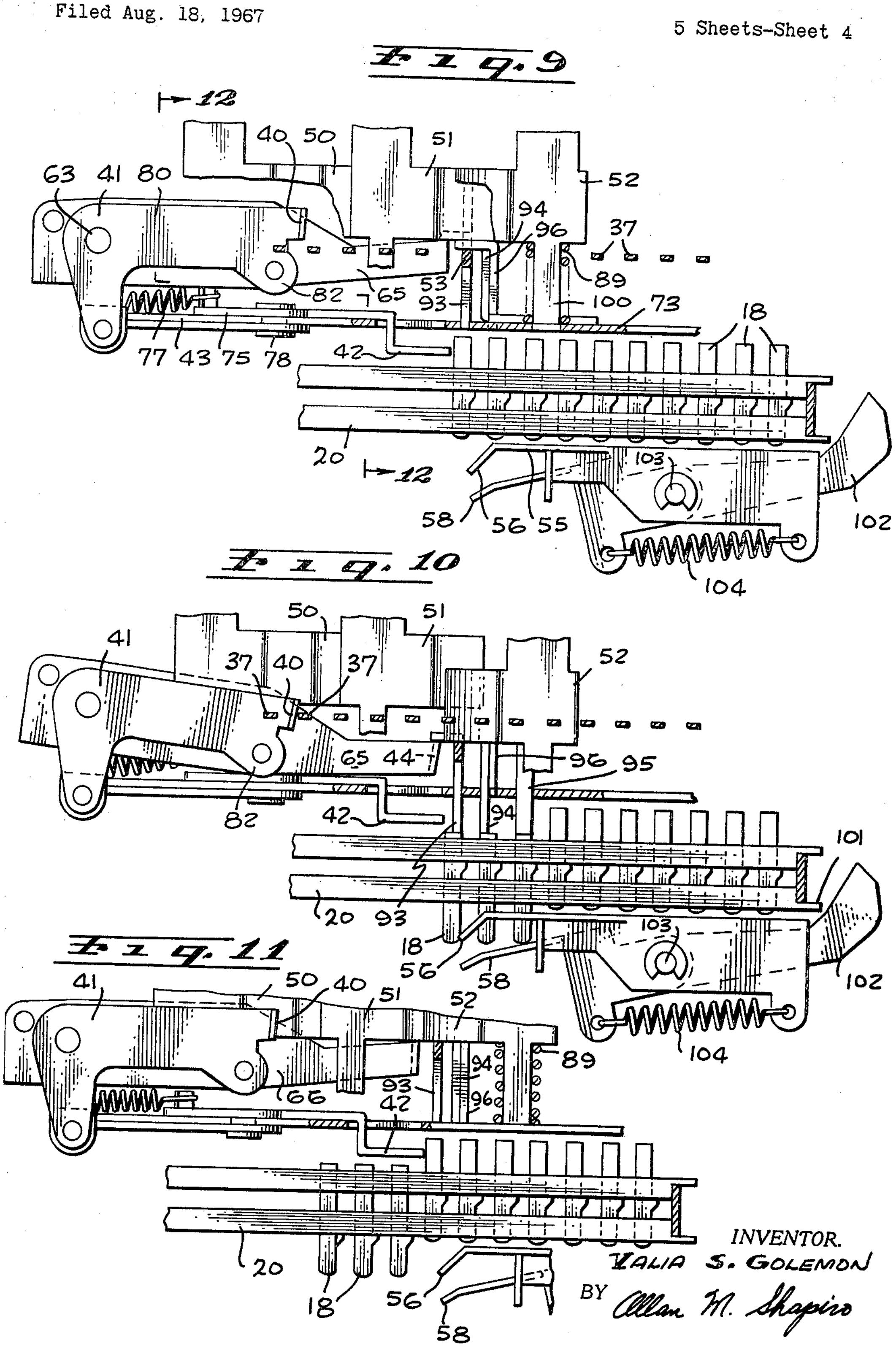
FIGURES 9–11 inclusive are enlarged side elevational views of the zero entry mechanism illustrating a typical sequence for setting pins of the carriage when the triple zero key is depressed.
Figures 12, 13, 14, 15, 16, 17, 18:
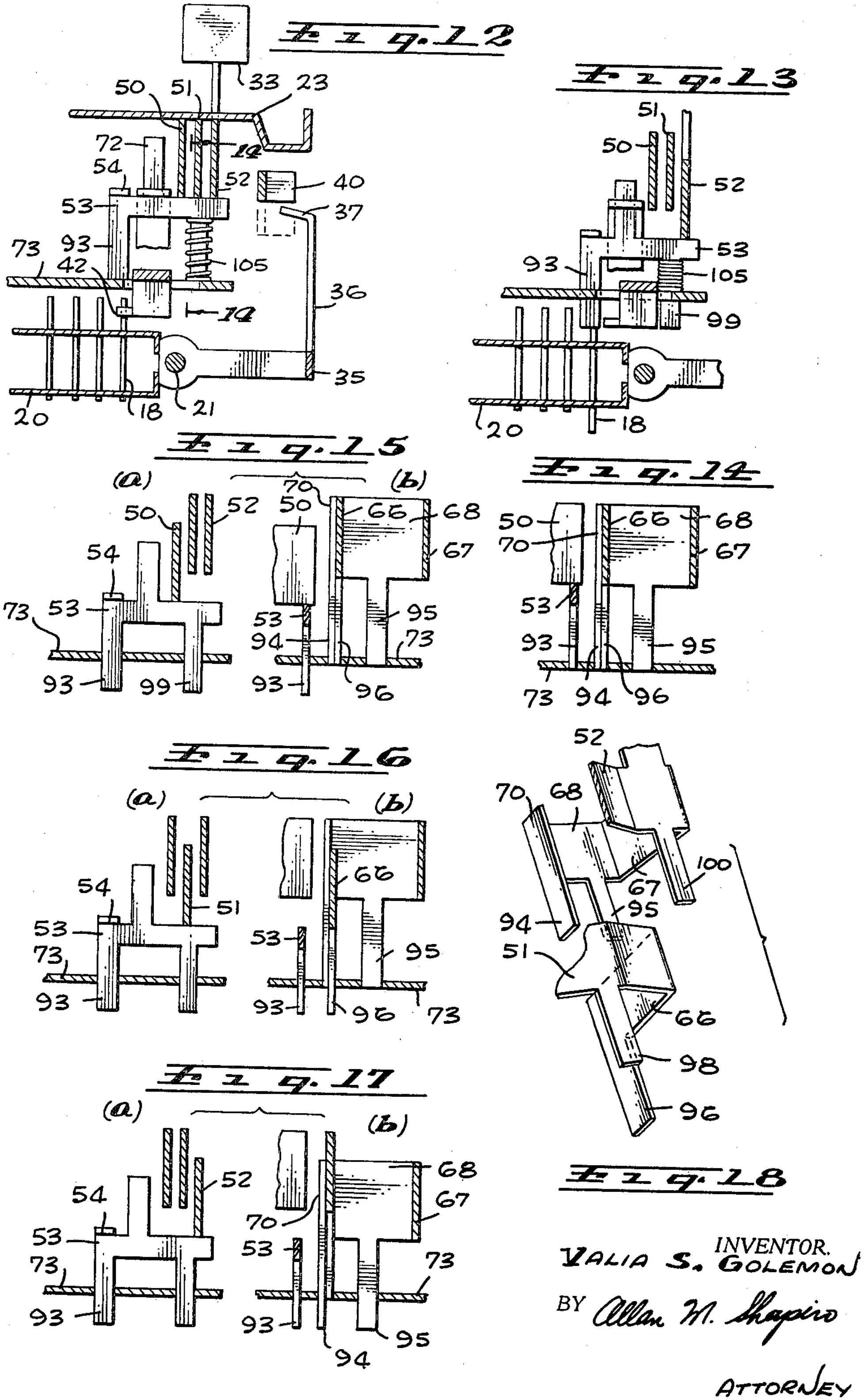
FIGURES 12 and 13 are sectional views, partly in elevation, of the zero entry mechanism as taken in the direction of arrows 12—12 of FIGURE 9 and illustrating a typical sequence for setting the pins of the carriage via the triple zero entry key.
FIGURE 14 is a sectional view, partly in elevation, of the three separate zero entry key members as taken in the direction of arrows 14—14 of FIGURE 12 illustrating the key members in an at rest position preparatory for selected zero entry.
FIGURE 18 is an exploded perspective view of the nested relationship between the double zero key member and the triple zero key member.

Referring to FIGURES 9–11 inclusive, a typical sequence of operation is illustrated when the triple zero amount key is depressed causing key member 52 associated therewith to move downwardly. The downward movement of the key member 52 causes the crossbar 53 to move down which thereby causes the end of stem 93 to engage and set the stop pin 18 which is the first stop pin in the row of zero stop pins carried on the pin carriage. Also, key member stem 95 sets the third stop pin 18 in the row while stem 94 engages and sets the second stop pin in the row of zero stop pins on the carriage. Stems 94 and 95 are integrally carried on the same structure as key member 52 as shown in FIGURE 18 so that downward pin setting movement is in unison when key member 52 is moved downwardly. This condition is illustrated in FIGURE 10 in addition to the illustration of the escapement means actuated by the engagement of the tab 54 with the universal bar 44 which pivots the bellcrank 41 so that projection 40 is interposed between teeth 37 on the carriage rack to prevent lateral movement of the carriage. At the same time, the stop member 42 is moved laterally to the broken line position shown in FIGURE 8 so that the stop member 42 is in its unblocking position with respect to the row of zero stop pins. Next, with reference to FIGURE 11, as the spring biasing means 89 and 105 returns the amount key 33 and the cross bar to their upward positions, the stems 93, 94 and 95 associated with the crossbar and the key member 52 are returned to their at rest positions. Simultaneously, the universal bar 44 is permitted to pivot upwardly and removes projection 40 from its interposed position between the rack teeth 37 to permit the carriage 20 to move in a lateral direction by spring 38. During the momentary time that the carriage is moving to the left, stop member 42 will pivot to its blocking position as shown in solid lines in FIGURE 8 in alignment with the row of zero stop pins so that the lateral movement of the pin carriage will be arrested upon the engagement of the stop member 42 with the fourth unset stop pin in the row. Consequently, the pin carriage may be said to have moved to the left three decimal places upon the depression of the triple zero amount key.

Additional single or multiple zeros may be entered into the keyboard to set selected stop pins as by following the procedure set forth above until the multi-digit number has been entered into the accumulator by the operator. At the conclusion of the entering procedure, the motor bar control 30 may be depressed which actuates the machine motor to cause the drive racks to move and enter the multi-digit number into the machine accumulator. At the conclusion of the entering of the digits into the accumulator, the carriage 20 is moved to the right so that the set stop pins associated with numerals "1–9" are forced into a reset position by means of engagement with ramp 56 carried on the stationary stripper blade 55. When the carriage 20 has reached its right-hand position, the end of the carriage represented by a numeral 101 will trip a resiliently biased lever 102 which will rotate about pivot connection 103 so that ramp 58 will move clockwise against the bottom end of the zero stop pins which were previously set and will move these latter stop pins to their at rest or reset position. The lever 102 is resiliently biased by means of spring 104 and the zero stop pins will remain in their at rest position until the machine operator depresses another zero amount key.

Referring now to FIGURES 12 and 13, it can be seen that the crossbar 53 is resiliently urged upwardly by means of expansion spring 105 which is compressed between the underside of crossbar 53 and the upper surface of guide plate 73. Furthermore, it can be seen that the stop member 42 is in direct alignment with the row of zero stop pins 18 carried by the pin carriage 20. When the stop member 42 is in its blocking position with respect to the set stop pins in the zero row, projection 40 is in the position shown in solid lines in FIGURE 12 out of engagement with the teeth 37 of the pin carriage rack 35. However, when the escapement means is actuated by the pivotal movement of the universal bar, the stop member 42 is pivoted laterally into an unblocking position while the projection 40 assumes the position shown in broken lines to arrest movement of the pin carriage. In FIGURE 13, the key member 52 associated with the triple zero amount key depression is shown in which the crossbar 53 is forced downwardly against the tension of spring 105 causing stem 93 to set a stop pin 18 in the zero row of stop pins.

In FIGURE 14, the key members 50, 51 and 52 are shown with only portion 70 of key member 51 illustrated and portions 66, 67 and 68 of key member 52 illustrated. However, the stems associated with the crossbar and the key members 51 and 52 are illustrated when the keyboard is at rest awaiting depression of the zero entry amount keys. In accordance with the section of the zero entry mechanism taken along lines 14—14 of FIGURE 12, it can be seen that the stems 93–96 inclusive are in alignment and include terminating ends which project through apertures 90–92 as shown in FIGURE 7.

With respect to FIGURES 15*a* and 15*b*, it can be seen that when the single zero amount key is depressed, key member 50 moves downwardly against crossbar 53 so that the stems 93 and 99 of the crossbar project beneath the undersurface of the guide plate 73. In this manner, only a single pin engaging stem, namely, stem 93, is projected below the guide plate 73 and the first zero stop pin in the row is set thereby.

FIGURES 16*a* and 16*b* illustrate the stems 93 and 96 as being projected below the undersurface of guide plate 73 when the double zero key member 51 is depressed. Thereby, the first and second stop pins in the zero row of stop pins are set. In FIGURES 17*a* and 17*b*, key member 52 is illustrated as being depressed whereby key stems 93, 94 and 95 project below the guide plate 73 to set the first three stop pins in the zero row.

Thereby, crossbar 53 is moved downwardly to project stem 93 to set the first stop pin in the row each time a zero amount key is depressed whether or not amount key 32, 33 or 34 is selected. In an effort to physically accommodate the key members and stems in a relatively reduced area or volume the key members 51 and 52 are nested in close arrangement as indicated in the exploded view of FIGURE 18. Construction in this fashion places stems 94 and 96 adjacent one another with stem 95 directly therebehind so that the three stems are in alignment with the zero pin arrangement on the pin carriage.

Therefore, the zero entry mechanism of the present invention provides a novel arrangement of key members associated with zero entry amount keys which provide stems adapted to set selected pins in the zero row of stop pins carried on the pin carriage. A novel escapement means is included which provides a projection 40 and stop member 42 which are differentially operated so that lateral movement of the pin carriage 20 is restricted during the digital entry procedure as the stop pins are being set.

Upon depression of a selected zero amount key, its associated key member will actuate the universal bar 44 which will cause clockwise rotation of bellcrank 41 to place projection 40 between adjacent teeth 37 carried by the carriage rack 35. The engagement of projection 40 with the teeth 37 prevent the carriage 20 from moving to the left as biased by the tension of spring 38. Simultaneously, the stop member 42 will be rotated laterally out of alignment with the zero row of pins so that when the zero entry amount key is released, bellcrank 41 will rotate in a counterclockwise direction to remove projection 40 from its engagement with the teeth 37 and the carriage 20 will move to the left while stop member 42 moves into alignment with the zero row of pins. The movement of the pin carriage 20 to the left will be arrested by engagement of the stop member with the first unset stop pin in the zero row. At this time, another zero entry may be made by any one of the zero amount keys 32, 33 or 34. If desired, the operator may enter numerical digits by depressing amount keys for the digital values "1–9" and the escapement means of the present invention will function as described above. It is to be borne in mind that when the amount keys "1–9" are depressed, the pin carriage may move only one increment equivalent to a single decimal place. This is also true for the single zero amount key. However, for multiple zero entry, the pin carriage must move a number of increments equivalent to the number of zeros being entered so as to represent a movement equivalent to hundredths or thousandths decimal locations.

The novel zero entry mechanism of the present invention satisfies this requirement and further provides an arrangement of key members, pin setting stems and escapement means which occupy a reduced volume of space as compared to conventional and prior art zero entry systems. It is to be understood that the present invention may be employed to automatically enter any multiple digits of identical value other than zero into the keyboard pin carriage preparatory to entry of the entire multi-digit number into the accumulator during machine cycling. If desired, the stems carried by the cross bar and various key members may be aligned with any of the "1–9" digit value stop pin rows. The pin carriage will laterally move equivalent to the decimal places of the multiple digit being entered.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. An entry mechanism adapted to introduce a preselected number of zero value digits into the accumulator of a calculating machine comprising:

manually actuated key means including a plurality of zero amount keys, each of which is operable to enter a predetermined number of zeros into the accumulator representing corresponding decimal-place locations for a given numerical value;

a movable intermediate keyboard entry means having a plurality of settable stop pins arranged in aligned rows and columns wherein each column corresponds to a decimal-place location and each row corresponds to the digits 0–8 inclusive:

said key means including a transverse cross bar underlying said zero amount keys in spaced relationship having a stem in alignment with said zero row to stop pins and operable in response to actuation of any of said zero amount keys to forcibly engage and set one of said stop pins in said zero row; and escapement means operable in response to actuation of a selected zero amount key to release said keyboard entry means for limited movement corresponding to a desired number of decimal-place locations as determined by the number of said stop pins set in said zero row responsive to actuation of said selected zero amount key.

2. The invention as defined in claim 1 wherein each of said zero amount keys includes parallel key members extending normal to said transverse cross bar and directly operable to set a selected number of said stop pins in said zero row in combination with said cross bar stem.

3. The invention as defined in claim 1 wherein each of said key members, except said key member movable by said zero amount key for entering a single zero, includes at least one stem in alignment with said zero row of stop pins which are adapted to forcibly engage and set at least one of said stop pins in said zero row adjacent to said stop pin set by said crossbar stem.

4. The invention as defined in claim 3 wherein said escapement means includes means alternately engageable with said keyboard entry means and said zero row of stop pins adapted to allow movement of said keyboard entry means for only a momentary period of time after actuation of any of said zero amount keys.

5. The invention as defined in claim 4, wherein said last-mentioned means includes a pivotal stop member normally biased to a blocking position in alignment with said zero row of stop pins adapted to engage the first unset stop pin in said zero and a pivoted projection adapted to be interposed in blocking relationship between a plurality of teeth on a rack fixedly carried on said keyboard entry means.

6. The invention as defined in claim 5 wherein said escapement means further includes a pivotal bellcrank carrying said pivotal stop member on one arm thereof and fixedly carrying said projection on the other arm thereof; and a universal bail pivotally mounted below said key members in fixed relationship to said bellcrank whereby rotation of said universal bail responsive to actuation of said key members via said cross bar causes said stop member and said projection to alternately and differentially release and block movement of said keyboard entry means.

7. The invention as defined in claim 6 including resilient means coupled to said keyboard entry means effective to bias said keyboard entry means in a direction to increase the decimal-place locations of the given numerical value.

8. In a zero entry mechanism for determining decimal-place location of a multi-digit number including multiple zero digits intended to be introduced into the accumulator of a calculating machine having a movable pin carriage with stop pins adapted to be set to mechanically record the multi-digit number prior to machine cycling, the combination comprising:

at least three zero amount keys, each adapted to enter a single zero, a double zero and a triple zero respectively into said accumulator;

a key member associated with each of said zero amount keys in parallel arrangement with other key members and adapted to independently move upon actuation of its associated zero amount key;

a transverse cross bar movably mounted immediately below said key members in spaced relationship thereto and being moved by forcible engagement of a selected one of said key members;

said cross bar having a stem and said key members having at least one stem wherein said stems are located above said pin carriage in parallel alignment with a zero row of stop pins and wherein selected stop pins in said row are settable by engagement with said stems;

spring means for resiliently biasing said pin carriage to move under said stems;

an elongated toothed rack carried on said pin carriage in parallel with zero row of stop pins; and escapement means operably coupling said key members with said zero row of stop pins and said toothed rack in alternate blocking relationship to controllably release said pin carriage for movement via said resilient bias until such movement is arrested by blocking engagement of said escapement means with the first unset stop pin in said zero row which is encountered thereby as said pin carriage moves.

9. The invention as defined in claim 8 wherein said escapement means includes a bellcrank connected to a pivotal universal bail adapted to be actuated by said key members via a tab carried on said cross bar and a projection carried on one arm of said bell crank adapted to engage said toothed rack and a pivotal stop member carried on the other arm of said bell crank; and means normally biasing said stop member out of alignment with said zero row of stop pins.

10. The invention as defined in claim 9 wherein said key members are formed with predetermined cooperative shapes in a nested compact space-saving relationship occupying a minimum volume area within the machine.

11. Entry mechanism for automatically entering multiple digits of identical value into the accumulator of a calculating machine comprising:

a resiliently biased and movable pin carriage having a plurality of settable stop pins arranged in rows and columns wherein each column represents a decimal place and each row represents a value selected from the series of 0–8;

manually operated key means for simultaneously setting selected and adjacent stop pins in a predetermined one of said rows corresponding to the multiple digits of identical value;

escapement means operable in response to said key means to selectively and alternately release and block movement of said pin carriage as determined by the combined total number of said selected and set stop pins so that all of the multiple digits of identical value are simultaneously entered into said pin carriage and said pin carriage is permitted to laterally move equivalent to the decimal places of the multiple digit entry preparatory for introduction into the machine accumulator;

said key means including key members associated with each of the multiple digits and each key member having at least one stem arranged over said predetermined row;

a movable crossbar disposed transversely beneath said key members in normally spaced apart relationship having a laterally projecting tab and a downwardly extending stem in alignment with said stems carried by said key members;

said crossbar stem adapted to be disposed in combination with selected ones of said key member stems to set said multiple selected stop pins while the movement of said pin carriage is blocked by said escapement means; and a pivotal universal bail actuated by said crossbar via said tab responsive to said key means to operate said escapement means to release said pin carriage for lateral movement.

12. The invention as defined in claim 11 wherein said escapement means includes a first means selectively engageable with said pin carriage via a toothed rack and a second means selectively engageable with said pin carriage via unset ones of said stop pins in said predetermined row; and said first and said second means differentially operable with respect to each other to alternately block lateral movement of said pin carriage.

13. The invention as defined in claim 11 wherein said key means comprises at least two separate movable key members and each key member and said crossbar have at least one stem cooperating in combination to simultaneously set at least two of said stop pins in said zero row of stop pins whereby multiple entry of double zero, triple zero and the like may be represented.

References Cited

UNITED STATES PATENTS

| | | | |
|---|---|---|---|
| 2,062,963 | 12/1936 | Benninger | 235—60 |
| 2,647,690 | 8/1953 | Anderson | 235—63 |
| 3,066,862 | 12/1962 | Zimmermann | 235—60 |
| 3,155,315 | 11/1964 | Giampiero et al. | 235—60 |
| 3,393,865 | 7/1968 | Okuda | 235—60 |

STEPHEN J. TOMSKY, Primary Examiner